United States Patent [19] [11] 4,213,883
Owens [45] Jul. 22, 1980

[54] METHOD FOR MANUFACTURE OF NEUTRON ABSORBING ARTICLES

[75] Inventor: Dean P. Owens, Tonawanda, N.Y.

[73] Assignee: The Carborundum Company, Niagara Falls, N.Y.

[21] Appl. No.: 866,102

[22] Filed: Dec. 30, 1977

[51] Int. Cl.[2] ............ C04B 35/68
[52] U.S. Cl. ............ 252/478; 250/518
[58] Field of Search ............ 250/518; 252/478

[56] References Cited

U.S. PATENT DOCUMENTS

| | | | |
|---|---|---|---|
| 2,942,116 | 6/1960 | Axelrod | 252/478 |
| 2,961,415 | 11/1960 | Axelrod | 252/478 |
| 3,434,978 | 3/1969 | Vogel | 252/478 |
| 3,453,160 | 7/1969 | Darling et al. | 252/478 |
| 3,705,101 | 12/1972 | Blum et al. | 250/518 |

*Primary Examiner*—Brooks H. Hunt
*Attorney, Agent, or Firm*—David E. Dougherty; Robert C. Weber; Raymond F. Kramer

[57] ABSTRACT

Neutron absorbing articles, such as those in plate form suitable for use in a storage rack for spent nuclear fuel and having such properties as to make them useful in such application for long periods of time, are made by an improved one-step curing method in which a mixture of boron carbide particles, powdered phenolic resin and a minor proportion of a liquid medium which boils at a temperature below 200° C., preferably water, is compacted to desired article form and is cured at an elevated temperature, without simultaneous imposition of pressure in compacting or pressing means, so as to cause bonding of the irreversibly cured phenolic polymer resulting to the boron carbide particles and production of the neutron absorber in desired form. In preferred aspects of the invention the proportions of boron carbide particles, resin and water are respectively, 60 to 80, 20 to 40 and 2 to 8, the resin is a phenol formaldehyde two-stage resin containing hexamethylenetetramine in sufficient quantity to provide formaldehyde to cure it, the resin is of a molecular weight in the range of 1,200 to 10,000, e.g., 6,500, the resin and the irreversibly cured polymer resulting are substantially free of halogens, lead, mercury, sulfur, filler, plasticizer and solvent and the boron carbide particles contain no more than 2% of iron and no more than 0.5% of $B_2O_3$. The described method is also employable when a proportion of the boron carbide particles, e.g., 1/10 to 9/10, is replaced by a diluent compound, such as silicon carbide, alumina, silica, graphite, amorphous carbon or mixtures thereof.

10 Claims, No Drawings

METHOD FOR MANUFACTURE OF NEUTRON ABSORBING ARTICLES

This invention relates to an improved method for manufacturing neutron absorbing articles. More particularly, it relates to the manufacture of such articles, preferably in plate form, by mixing boron carbide particles, with or without additional diluent particles, a curable particulate (or powdered) normally solid phenolic resin and a liquid which vaporizes at or below a curing temperature, and curing such mixture at an elevated temperature. The products made are useful neutron absorbers which may be included in neutron absorbing structures and assemblies, such as storage racks for the storage of spent nuclear fuel.

As has been described in a U.S. patent application of McMurtry, Naum, Owens and Hortman, Ser. No. 854,966, for Neutron Absorbing Article and Method for Manufacture of Such Article, filed on Nov. 25, 1977, a useful way to increase the neutron absorbing capability of a pool in which spent nuclear fuel is stored, and thereby to enlarge pool capacity, is to utilize storage racks for the nuclear fuel wherein the fuel is surrounded by boron carbide-phenolic polymer neutron absorbing articles. In that patent application there is described a two-step method for making the neutron absorbing articles, utilizing liquid state phenolic resin and boron carbide particles. In a U.S. patent application of Roger S. Storm Ser. No. 856,378, filed Dec. 1, 1977, entitled One-Step Curing Method for Manufacture of Neutron Absorbing Plates, an improved method for manufacturing neutron absorbers is described, utilizing only one step for the incorporation of the polymeric resin in the mix to be cured, instead of the two steps of the McMurtry et al. method. Now a further advance has been made in the method for the manufacture of such articles, as a result of which the method is simplified and the product is more uniform. Such method is especially applicable to the manufacture of neutron absorbing articles based essentially on boron carbide particles and phenolic polymer but is also useful in the making of similar articles of intentionally lower neutron absorbing capabilities, in which the boron carbide particles are "diluted" with other powdered materials, which articles are described in an application for a U.S. patent application of Naum, Owens and Dooher Ser. No. 866,101, entitled Neutron Absorbing Article, filed Dec. 30, 1977. The articles made by the present method, in addition to being useful for absorbing neutrons from spent nuclear fuels, may also be employed in various other neutron absorbing applications, such as in absorbing neutrons emitted by various nuclear materials, including fresh nuclear fuel, and in absorbing neutrons from nuclear materials while they are being transported, rather than being stored.

The superiority of the neutron absorbing articles of the applications mentioned over other neutron absorbers, such as those described in U.S. Pat. Nos. 2,796,411; 2,796,529; 2,942,116; and 3,133,887, depends in large part on the desirably sized boron carbide particles being uniformly distributed throughout a matrix of irreversibly cured phenolic polymer wherein the polymer tenaciously holds to the boron carbide particles (and any diluent particles which may be present), making a stable, yet sufficiently flexible structure to be long lasting and useful in the absorbing of neutrons from nuclear materials. Additionally, the absorbing articles made are sufficiently stable so as to be useful at the various temperatures which may be encountered in racks for the storage of spent nuclear fuel, under the various temperature variations therein, under radiation from the nuclear fuel, in the presence of aluminum and stainless steel (no galvanic corrosion experienced) and in the presence of water, which could contact them if the stainless steel enclosure for the articles was to leak. By addition of diluent the absorbing power of the article can be accurately controllable so that effective neutron absorption to a pre-calculated desirable extent is obtainable.

Although both the two-step and one-step methods described in the McMurtry et al. and Storm patent applications previously mentioned resulted in the production of satisfactory neutron absorbers, meeting the requirements set forth above, the two-step method involved more processing and consequently was more expensive than the one-step method. Also, the additional processing involved often resulted in more breakage of the articles being handled, causing an increase in processing expense. Consequently, the one-step method of Storm represented a significant advance in manufacturing techniques. However, such one-step method did require the mixing of particulate components, including the particulate (or powdered) solid resin with liquid state resin and such mixing sometimes produced lumpy agglomerates due to the high viscosity of the liquid and some difficulty experienced in evenly distributing it throughout the normally greater proportion of solid material, both the solid state resin powder and the boron carbide particles employed. Because of such lumping and insufficient contacting of the particulate materials with the liquid resin, which was also serving as a binder, to obtain even distribution of the boron carbide particles throughout the resin, the lumps, when present, had to be broken up, as by screening, but such operation could result in adherence of the liquid resin to the screen and, on the whole, was more difficult to effect than the normal screening of the previous two-stage method. If any lumps produced were not broken up and if, after being size-reduced they were not sufficiently dispersed in the remainder of the composition to be molded and cured, irregularities could appear in the product, leading to uneven neutron absorbing capability and also, sometimes, to premature failures of such articles in use.

The present method has the advantages of an easily carried out single step process, utilizing only one type of resin (if desired), in one physical state (solid particulate), processing with ease and producing a neutron absorbing article in which boron carbide particles (possibly with a diluent particles present, too) are evenly distributed throughout. Mixing of the composition before pressing and curing is simplified, little or no screening is required and the final products are of the desired characteristics previously mentioned (and others to be mentioned subsequently). In accordance with the present invention, a one-step curing method for the manufacture of a neutron absorbing article comprises irreversibly curing, in desired article form, a form-retaining mixture of boron carbide particles, curable phenolic resin in solid state and in particulate form and a minor proportion of a liquid medium, which boils at a temperature below 200° C., at an elevated temperature so as to obtain bonding of the irreversibly cured phenolic polymer resulting to the boron carbide particles and production of the neutron absorbing article in desired form. To make by the present method the "diluted" neutron absorbing articles of the Naum et al. application previously referred to, a proportion of the boron carbide particles of the boron carbide-phenolic polymer composition may be replaced in a suitable initial mixing stage by diluent particles, such as those of silicon carbide, alumina, silica, graphite and/or amorphous carbon.

The boron carbide employed should be in finely divided particulate form. This is important for several reasons, among which are the production of effective bonds to the phenolic polymer cured about the particles, the production of a continuous bonding of polymer with the boron carbide particles at the article surface and the obtaining of a uniformly distributed boron carbide content in the polymeric matrix. It has been found that the particle sizes of the boron carbide should be such that substantially all of it (over 95%, preferably over 99% and more preferably over 99.9%) or all passes through a No. 20 (more preferably No. 35) screen. Preferably, substantially all of such particles, at least 90%, more preferably at least 95%, passes through a No. 60 U.S. Sieve Series screen and at least 50% passes through a No. 120 U.S. Sieve Series screen. Although there is no essential lower limit on the particle sizes (effective diameters) usually it will be desirable, from a processing viewpoint and to avoid objectionable dusting during manufacture, for no more than 25% and preferably less than 15% of the particles to pass through No. 325 and/or No. 400 U.S. Sieve Series screens and normally no more than 50% thereof should pass through a No. 200 U.S. Sieve Series screen, preferably less than 40%.

In addition to boron carbide particle size being of importance in the making of successful neutron absorbers of the present type it is highly desirable that the boron carbide be essentially $B_4C$. It has been suggested by others at the present applicant's assignee company that materials such as silicon carbide, alumina, silica, graphite and carbon may be partly substituted for boron carbide in neutron absorbers of lower desired absorbing activities than those containing similar total amounts of $B_4C$ alone, without loss of such lower absorbing properties and without deterioration of the physical properties of the articles made, and such articles of lower neutron absorbing capabilities may also be made by the method of this invention.

Boron carbide often contains impurities, of which iron (including iron compounds) and $B_2O_3$ (or impurities which can readily decompose to $B_2O_3$ on heating) are among the more common. Both of such materials, especially $B_2O_3$, have been found to have deleterious effects on the present products and therefore contents thereof are desirably limited therein. For example, although as much as 3% of iron (metallic or salt) may be tolerable in the boron carbide particles of the present high boron carbide content absorbers, preferably the iron content is held to 2%, more preferably to 1% and most preferably is less than 0.5%, even sometimes being held below 0.2%. Similarly, to obtain stable absorbing articles, especially when they are of long, thin plate form, it is important to limit the $B_2O_3$ content (including boric acid, etc., as $B_2O_3$), usually to no more than 2%, preferably less than 1%, more preferably less than 0.5% and most preferably less than 0.2%. Of course, the lower the iron and $B_2O_3$ contents the better.

The boron carbide particles utilized will usually contain the normal isotopic ratio of $B^{10}$ but may also contain more than such proportion to make even more effective neutron absorbers. Of course, it is also possible to use boron carbide with a lower than normal percentage of $B^{10}$ (the normal percentage being about 18.3%, weight basis, of the boron present) but such products are rarely encountered and are less advantageous with respect to neutron absorbing activities.

Other than the mentioned impurities normally boron carbide should not contain other components than $B_4C$ (boron and carbon in ideal combination) and minor variants of such formula in significant amounts, unless the $B_4C$ is intentionally diminished in concentrations by use of a diluent or filler material, such as silicon carbide. Thus, for satisfactory absorbing effectiveness at least 90% of the boron carbide particles should be boron carbide, preferably at least 94% and more preferably at least 97%, and the $B^{10}$ content of the article (from the boron carbide), for best absorption characteristics, will be at least 12%, preferably at least 14% (14.3% $B^{10}$ in pure $B_4C$). To maintain the purity of the boron carbide-phenolic polymer or diluted article made it is considered to be important to severely limit the contents of halogen, mercury, lead and sulfur and compounds thereof, such as halides, and so of course, these materials, sometimes found present in impure phenolic resins, solvents, fillers and plasticizers, will be omitted from those and will also be omitted from the composition of the boron carbide particles to the extent that this is feasible. At the most, such materials will contain no more of such impurities, etc., than would result in the final product just meeting the upper limits thereof, which will be mentioned in more detail in a subsequent discussion with respect to the phenolic polymer and the resins from which it is made.

When diluent or filler materials are employed in the present articles to diminish the neutron absorbing activities thereof the materials employed will be such as are compatible with the other components of the present article, principally the boron carbide particles and the phenolic resin and will be able to withstand the conditions of use thereof. Thus, the "diluents" will usually be inert particulate solids which are insoluble in water and aqueous media to which the neutron absorbing articles might become exposed during use. Such materials should be heat resistant, substantially inert chemically and of comparatively low coefficients of thermal expansion. Generally, inorganic materials such as carbon and compounds, such as carbides and oxides, best satisfy these requirements and the most preferred diluents and fillers are silicon carbide, alumina, silica, graphite and amorphous carbon although two-component and multi-component mixtures of such materials may also be utilized. Usually, the materials to be employed should be anhydrous, although they may contain small proportions, such as 0.5 to 3%, e.g., 1%, of moisture, but hydrates may be utilized if the water content thereof is satisfactorily volatilized during curing of the phenolic polymer of the present articles at elevated temperature. Normally the diluents employed will be in particulate form and the powders thereof will be of particle size characteristics like those previously described for the boron carbide particles. While such particle sizes are generally preferred, it is also within the invention to utilize more finely divided fillers, usually however providing that the particle sizes are not so small as to cause excessive dusting. Thus, while as much as 95% or more of the diluent particles may pass a 200 mesh sieve it will usually be preferred that no more than 50% of the particles, preferably less than 25% and more preferably, less than 15%, pass through a No. 325 sieve. Although particle sizes within the described ranges yield satisfactory neutron absorbers, best results, with greatest strengths and improved and stable physical properties, e.g., flexural strength, under use conditions, are obtained when the particle sizes (of the diluents) are like those of the boron carbide particles (in the same specific range). With respect to impurities, as was previously mentioned, both the boron carbide particles and diluent particles should have low contents, if any at all, of $B_2O_3$, iron, halogen, mercury, lead and sulfur and compounds thereof. Although it is desirable that each component of the present composition have less of such impurities than the particular proportions given with respect to the boron carbide and the resin, it is considered that the important factor is the total content of such materials and providing that the total content is maintained within the specifications, variations in impurities contents of the components may be tolerated.

The solid irreversibly cured phenolic polymer, cured to a continuous matrix about the boron carbide particles (or boron carbide particles plus diluent particles) in the neutron absorbing articles, is one which is made from a phenolic resin which is in solid form at normal temperatures, e.g., room temperature, 20°–25° C. The phenolic resins constitute a class of well known thermosetting resins. Those most useful in the practice of the present invention are condensation products of phenolic compounds and aldehydes, of which phenolic compounds phenol and lower alkyl- and hydroxy-lower alkyl substituted phenols are preferred. Thus, the lower alkyl substituted phenols may be of 1 to 3 substituents on the benzene ring, usually in ortho and/or para positions and will be of 1 to 3 carbon atoms, preferably methyl, and the hydroxy-lower alkyls present will similarly be 1 to 3 in number and of 1 to 3 carbon atoms each. Mixed lower alkyls and hydroxy-lower alkyls may also be employed but the total of substituent groups, not counting the phenolic hydroxyl, is preferably no more than 3. Although it is possible to make a useful product with the phenol of the phenol aldehyde resin being essentially all substituted phenol, some phenol may also be present with it, e.g., 5 to 50%. For ease of expression the terms "phenolic type resins", "phenol-aldehyde type resins" and "phenol-formaldehyde type resins" may be employed in this specification to denote more broadly than "phenol-formaldehyde resins" the acceptable types of materials described, which have properties equivalent to or similar to those of phenol-formaldehyde resins and trimethylol phenol formaldehyde resins when employed to produce thermosetting polymers in conjunction with boron carbide (plus diluent) particles, as described herein.

Specific examples of useful "phenols" which may be employed in the practice of this invention, other than phenol, include cresol, xylenol and mesitol and the hydroxy-lower alkyl compounds preferred include mono-, di- and trimethylol phenols, preferably with the substitution at the positions previously mentioned. Of course, ethyl and ethylol substitution instead of methyl and methylol substitution and mixed substitutions wherein the lower alkyls are both ethyl and methyl, the alkylols are both methylol and ethylol and wherein the alkyl and alkylol substituents are also mixed, are also useful. In short, with the guidance of this specification and the teaching herein that the presently preferred phenols are phenol and trimethylol phenol, other compounds, such as those previously described, may also be utilized providing that the effects obtained are similarly acceptable. This also applies to the selection of aldehydes and sources of aldehyde moieties employed but generally the only aldehyde utilized will be formaldehyde (compounds which decompose to produce formaldehyde may be substituted).

The phenolic or phenol formaldehyde type resins utilized are employed as either resols or novolaks. The former are generally called one-stage or single-stage resins and the latter are two-stage resins. The major difference is that the single-stage resins include sufficient aldehyde moieties in the partially polymerized lower molecular weight resin to completely cure the hydroxyls of the phenol to a cross-linked and thermoset polymer upon application of sufficient heat for a sufficient curing time. The two-stage resins or novolaks are initially partially polymerized to a lower molecular weight resin without sufficient aldehyde present for irreversible cross-linking so that a source of aldehyde, such as hexamethylenetetramine, has to be added to them in order for a complete cure to be obtained by subsequent heating. Either type of resin may be employed to make phenolic polymers such as those described herein.

The solid state resin employed is of a molecular weight sufficient to result in the resin being a solid. Generally the molecular weight of the resin will be in the range of 1,200 to 10,000 preferably 5,000 to 8,000 and more preferably 6,000 to 7,000, e.g., 6,500. The resin may have a small proportion of water present with it, usually adsorbed thereon and usually being less than 3% of the total resin or resin plus formaldehyde donor weight. If the resin is a resol it already contains sufficient formaldehyde for a complete cross-linking cure but if it is a novolak or two-stage resin it may have with it a formaldehyde donor such as hexamethylenetetramine, in sufficient quantity to cross-link the resin to irreversible polymerization (a thermoset). The quantity of cross-linking agent may vary but usually 0.02 to 0.2 part per part of resin will suffice. To avoid ammonia production during curing nitrogen-free formaldehyde donors may be employed, such as paraldehyde or a two-stage resin may be mixed with a one-stage resin containing excess combined or uncombined formaldehyde. Normally the particle sizes of the solid state two-stage or one-stage resins employed will be less than 140 mesh, U.S. Standard Sieve series and preferably over 95% will be of particle sizes less than 200 mesh, to promote ready mixing with the boron carbide particles and to promote even dispersion of the resin and such particles.

The liquid medium employed, the function of which is to assist in temporarily binding the powdered resin to the boron carbide particles (when boron carbide particles are mentioned it is considered that instead thereof there may be employed mixtures of boron carbide particles and diluent particles, such as those of the types previously mentioned), may be any of various suitable liquids which can be volatilized off from the curing mixture at a temperature below the curing temperature. Because the curing temperature is normally below about 200° C. it is highly preferable that the liquid medium be composed of materials which can be volatilzed or boiled off at a temperature below 200° C. Most preferable of all such materials is water but aqueous solutions or even dispersions of other volatilizable, decomposable or reactant materials may also be employed. Thus, aqueous alcoholic liquids may be utilized, such as blends of water and ethanol, water and methanol, water and isopropanol. It may be desirable to employ aqueous solutions of formaldehyde or of hexamethylenetetramine, too. Additionally, phenol may be present in aqueous or aqueous alcoholic solution. Instead of using aqueous solutions of alcohol the alcohols and other solvents may be utilized alone but generally this is not preferred because of expense, solvent recovery requirements and flammability hazards. When water is employed it will preferably be used alone or will be a major proportion of any mixed liquid, preferably being from 50 to 95% thereof, more preferably 70 to 95% thereof. Often care should be taken to make sure that the water used is pure (deionized or distilled water may be preferred) so as not to add any undesirable impurities to the final product.

The moisture or liquid content of the article being cured is usually in the range of 1 to 12%, preferably 2 to 5% and more preferably 3 to 4%, and the moisture content of the mix may be adjusted accordingly (and drying before pressing and also before curing may be adjusted accordingly, too). For example 3 to 8 or 4 to 5 parts of water may be added to 100 parts of absorber particles-resin mixture.

Among the useful phenolic resin materials that may be employed in fine particulate from that which is presently most preferred is Arofene-877, manufactured by Ashland Chemical Company, but other resins, such as Arofenes 7214; 6745; 6753; 6781; 24780; 75678; 877LF; and 890LF; all made by Ashland Chemical Company, and PA-108, manufactured by Polymer Applications, Inc., and various other phenolic resins, such as described at pages 478 and 479 of the 1975–1976 Modern Plastics Encyclopedia, the manufactures of which resins are listed at page 777 thereof, may be substituted. Many of such resins are two-stage resins, with hexamethylenetetramine (HMT) incorporated, but single stage solids may also be used, as may be two-stage resins with other aldehyde sources included and those dependent on addition of aldehyde. Although the mentioned resins are preferred, a variety of other equivalent phenolic type resins, especially phenol-formaldehydes, of other manufactures and of other types may also be employed providing that they satisfy the requirements for making the molded neutron absorbing articles set forth in this specification. In this respect it is important that the resins selected for use from the described group should be sufficiently tackified or rendered adherent by the liquid employed in making the wetted mixture so that the pressed green article made will be form retaining, yet non-dripping, while being heated to curing temperature.

As was previously mentioned, various objectionable impurities will preferably be omitted from the present articles and the components thereof. Additionally, for most successful production of the present neutron absorbers, which should contain only very limited amounts, if any at all, of halogens, mercury, lead and sulfur, the content of $B_2O_3$, which may tend to interfere with curing, sometimes causing the "green" molded article to lose its shape during the cure, and which can have adverse effects on the finished article, and the content of iron will also preferably be limited. Generally, less than 0.1% of each of the mentioned impurities (except the $B_2O_3$ and iron) is in the final article, preferably less than 0.01% and most preferably less than 0.005%, and contents thereof in the resins are limited accordingly, e.g., to 0.4%, preferably 0.04%, etc. To assure the absence of such impurities the phenol and aldehyde employed will initially be free of them, at least to such an extent as to result in less than the limiting quantities recited, and the catalysts, tools and equipment employed in the manufacture of the resins will be free of them, too. To obtain such desired results the tools and equipment will preferably be made of stainless steel or aluminum or similarly effective non-adulterating material. Also usually, non-volatile plasticizers, fillers and other components sometimes employed with the resins will be omitted.

The proportions of boron carbide particles and irreversibly cured phenol formaldehyde type polymer in the neutron absorbing article will normally be about 60 to 80% of the former and 20 to 40% of the latter, preferably with the total being 100%. Other impurities, such as water, solvent, filler, plasticizer, halide or halogen, mercury, lead and sulfur should not be present or if any of such is present, the amount thereof will be limited as previously described and otherwise held to no more than 5% total. Preferably, the component proportions will be 65 to 80% and 20 to 35%, with the presently most preferred proportions being about 70% and 30% or 74% and 26%, and with essentially no other components in the neutron absorber (the water is essentially all volatilized off during curing). Within the proportions described the product made has the desirable physical characteristics for use in storage racks for spent nuclear fuel, which characteristics will be detailed later. Also, the described ratios of boron carbide particles and phenolic resin permit manufacture by the simple, inexpensive, yet effective method of this invention.

To manufacture the present neutron absorbers, such as those in thin plate form, the boron carbide particles and powdered resin are mixed together, after which moisture is applied to the surface thereof by spraying, dripping or other suitable means to obtain best contact with all the particles and the moistened mix is compressed to "green" plate form and cured to a final product. Various orders of addition of the three principal components may be employed and sometimes the moisture may be added to boron carbide particles and/or the powdered resin prior to mixing thereof but it is preferred to mix the boron carbide particles (or mixture with diluent) with the solid state resin until a satisfactory blend is obtained, which will usually take from 1 minute to 20 minutes, preferably 2 to 10 minutes, after which the moisture is added and mixed in. Preferably, while the addition of moisture or other liquid is being effected the mixing of boron carbide particles and powdered resin is continued over a period of time similar to that of the initial mixing of the particulate materials. To prevent making an unevenly molded product it may be desirable to screen the resin powder initially, through a fine screen, such as 200 mesh, preferably No. 230, U.S. Standard Sieve series. After the blend appears to be uniform the mix may be spread out and allowed to dry somewhat to remove some of the moisture and/or solvent (if solvent is utilized with the water applied), normally removing from ½ to 3% of the mixture weight, e.g., 1%, over from 5 minutes to one hour, e.g., 20 minutes. The drying step can often be omitted if the initial moisture content of the mix is sufficiently low, e.g., 2 to 5%. Normally, the resin-boron carbide mixture at this stage will be essentially homogeneous but small lumps may form and therefore it is desirable to screen the mix, often with a 4 to 40 mesh screen, e.g., 10 mesh, U.S. Sieve Series. Of course, during the entire manufacturing procedure materials employed will be such that they will not donate objectionable impurities to the mix. Thus, normally, stainless steel, steel, aluminum and polymeric plastics will be the materials that come into contact with the components, the mix, the green article and the final product.

Next the desired, pre-calculated weight of grain-resin mixture is screened into a clean mold cavity of desired shape through a screen of 4 to 20 mesh size openings, preferably of 6 to 14 mesh, on top of a bottom plunger, aluminum setter plate and preferably glazed paper, preferably with the glazed side to the mix, and is leveled in the mold cavity by sequentially running across the major surface thereof a plurality of graduated strikers (other separators than glazed paper can also be used, e.g., paper, cloth). This gently compacts the material in the mold, while leveling it, thereby distributing the boron carbide and resin evenly throughout the mold so that when such mix is compressed it will be of uniform density and $B^{10}$ concentration throughout. Preferably, a sheet of glazed paper is placed on top of the leveled charge, glazed side against the charge, and atop this there are placed a top setter plate and a top plunger, after which the mold is inserted in a hydraulic press and is pressed at a pressure of about 20 to 500 kg./sq. cm., preferably 35 to 150 kg./sq. cm., for a time of about 1 to 30 seconds, preferably 2 to 5 seconds. After removal from the molding press, plungers and plates on both sides of the pressed mixture, together with the pressed mixture, are removed from the mold together, the plungers and the setter plates are removed and the release papers are stripped from the pressed mixture. Fiberglass cloths are placed next to the molded item and then the green absorber plate and setter plate(s) (usually aluminum) are reassembled, with fiberglass cloth(s) between them. The assemblies are then inserted in a curing oven and the resin is cured. The cure may be effected with a plurality of sets of setter plates and green plates atop one another, usually three to ten, but curing may also be effected without such stacking, with only a lower setter place being used for each green plate. Also, because the present mixes are not objectionably sticky, use of the fiberglass cloths may be omitted and in some cases use of the glazed paper may be omitted during pressing, at least for the portion of the mix in contact with the bottom setter plate, held in place during curing.

The cure may be carried out in a pressurized oven, sometimes called an autoclave, but good absorber plates may also be made without the use of pressure during the curing cycle. The curing temperature is usually between 130° and 200° C., preferably 140° to 160° or 180° C. and the curing will take from 2 to 20 hours, preferably 2 to 10 hours and most preferably 3 to 7 hours. For best results the oven will be warmed gradually to curing temperature, which facilitates the gradual evaporation of some liquid from the green articles before the curing temperature is reached, thereby helping to prevent excessive softening of the green plate and loss of shape thereof. A typical warming period is one wherein over about 1 to 5 hours, preferably 2 to 4 hours, the temperature is gradually increased from room temperature (10° to 35° C.) to curing temperature, e.g., 149° C., at which temperature the green plate is held for a curing period, and after which it is cooled to room temperature at a regular rate over about 1 to 6 hours, preferably 2 to 4 hours, after which the cured article may be removed from the oven. When the oven is pressurized the pressure may often be from about 2 to 30 kg./sq. cm., preferably 5 to 10 kg./sq. cm. gas pressure (not compressing or compacting pressure).

Instead of heating from room temperature to curing temperature in the allotted period described above, if considered desirable to improve the physical state of the green plate before curing it may be subjected to heating and drying in the oven at a temperature of about 40° to 60° C., e.g., 52° C., for about 6 to 48 hours, e.g., 24 hours, before such temperature is raised to curing level.

In the process described an important consideration is to make the boron carbide-resin mix initially strong enough to adhere together during compacting and hold together during removal from the mold and then to raise the temperature to curing level in such a manner, desirably with some drying, so that when the curing temperature is reached, before the cure occurs, there will not be any collapsing of the plates and loss of their desired regularity of shape. By utilizing gas pressure on the article being cured bleeding of resin can be counteracted, with the pressure tending to hold any liquefied resin inside the green plate or on the surface thereof until it is cured but because of the absence of normally liquid resin present bleeding is rarely any problem. Because there is little bleeding of resin from the article being cured the finally cured neutron absorber may be readily removed from the setter plate or from the fiberglass cloth and cures of undistorted articles are obtained, which, when in plate form, are of regular flatness. When the shapes of the neutron absorbing articles are modified the setter plates will be shaped accordingly to match them.

Although the neutron absorbing articles made in accordance with the invented process may be of various shapes, such as arcs, cylinders, tubes (including cylinders and tubes of rectangular cross-section), normally they are preferably made in comparatively thin, flat plates, which may be long plates or which may be used a plurality at a time, preferably erected end to end, to obtain the neutron absorbing properties of a longer plate. To obtain adequately high neutron absorbing capability the articles will usually be from 0.2 to 1 cm. thick and plates thereof will have a width which is 10 to 100 times the thickness and a length which is 20 to 500 times such thickness. Preferably, the width will be from 30 to 80 times the thickness and the length will be 100 to 400 times that thickness.

The neutron absorbing articles made in accordance with this invention are of a desirable density, normally within the range of about 1.2 g./cc. to about 2.8 g./cc., preferably 1.3 to 2 g./cc., e.g., 1.6 g./cc. When made of boron carbide and phenolic resin they are of satisfactory resistance to degradation due to heat and due to changes in temperature. They withstand radiation from spent nuclear fuel over exceptionally long periods of time without losing their desirable properties. They are designed to be sufficiently chemically inert in water so that a spent fuel storage rack in which they are utilized could continue to operate without untoward incident in the event that water leaked into their stainless steel container. They do not galvanically corrode with aluminum and stainless steel and are sufficiently flexible to withstand seismic events of the types previously mentioned. Thus, they are of a modulus of rupture (flexural) which is at least 100 kg./sq. cm. at room temperature, 38° C. and 149° C., a crush strength which is at least 750 kg./sq. cm. at 38° C. and 149° C., a modulus of elasticity which is less than $3\times10^5$ kg./sq. cm. at 38° C. and a coefficient of thermal expansion at 66° C. which is less than $1.5\times10^{-5}$ cm./cm. °C. When the boron carbide content is "diluted" with other high temperature resistant, water insoluble, inorganic particulate materials, such as silicon carbide (preferred) or others mentioned, of similar or smaller particle size, the same types of physical properties are obtainable, as are the same chemical properties, providing that the medium of the storage pool, usually aqueous, is one which does not adversely react with the diluent substance. In the described "diluted" articles of desirably lower and regulatable neutron absorbing activities, the proportions of boron carbide particles and diluent particles will be selected to accomplish the desired dilution. Preferably, the ratio of boron carbide particles to diluent particles is in the range of 1:9 to 9:1, preferably 1:1 to 9:1 but the ratios may be changed, normally within the ranges given, to obtain the particular neutron absorbing capability desired.

The absorbing articles made, when employed in a storage rack for spent fuel, as in an arrangement like that shown at FIGS. 1-3 of the McMurtry et al. patent application previously mentioned, which, together with the other two applications mentioned, is hereby incorporated by reference, are designed to give the desired extent of absorption of slow moving neutrons, prevent active or runaway nuclear reactions and allow an increase in storage capacity of a conventional pool for spent fuel storage. The designed system is one wherein the aqueous medium of the pool is water at a slightly acidic or neutral pH or is an aqueous solution of a boron compound, such as an aqueous solution of boric acid or buffered boric acid, which is in contact with the spent fuel rods, although such rods are maintained out of contact with the present boron carbide-phenolic polymer neutron absorber plates. In other words, although the spent fuel is submerged in a pool of water or suitable aqueous medium and although the neutron absorber plates are designed to surround it they are normally intended to be protected by a sealed metallic or similar enclosure from contact with both the pool medium and the spent fuel.

The absorber plates made in accordance with this invention by the method described above are subjected to stringent tests to make sure they possess the desired resistances to radiation, galvanic corrosion, temperature changes and physical shocks, as from seismic events. Because canisters or compartments in which they can be utilized might leak, they also should be inert or substantially inert to long term exposure to storage pool water, which, for example, could have a pH in the range of about 4 to 6, a fluoride ion concentration of up to 0.1 p.p.m., a total suspended solids concentration of up to 1 p.p.m. and a boric acid content in the range of 0 to 2,000 p.p.m. of boron. Also, the "poison plates" of this invention should be capable of operating at normal pool temperatures, which may be about 27° to 93° C., and even in the event of a leak in the canister should be able to operate in such temperature range for relatively long periods of time, which could be up to six months or sometimes, a year. Further, the products should be able to withstand $2\times10^{11}$ rads total radiation, should not be galvanically corroded in use and should not cause such corrosion of metals or alloys employed. In this respect, while normally ordinary 304 or 316 stainless steel may be used for structural members when seismic events are not contemplated, where such must be taken into consideration in the design of storage racks utilizing the present absorbers high strength stainless steels will preferably be used.

The advantages of the present method over prior art methods, particularly those of the McMurtry et al. and Storm applications referred to previously (which appear to be the closest prior art), are primarily with respect to the elimination of processing steps, easier processing and the obtaining of a useful product which is equal to or superior to the product of such applications in some characteristics. The neutron absorbers made by the present method are as regular in shape as those made by the processes of the McMurtry et al. and Storm applications and possess similar performance characteristics. Despite the fact that the only liquid "binder" being employed is moisture or an aqueous alcoholic or similar liquid medium (and such is employed in small proportion), the boron carbide (and diluent) particles are tightly held by the resin matrix. The invention represents a useful and important commercial advance in the art of efficiently and economically manufacturing accurately reproducible absorber plates and articles. It allows the manufacture of such radiation resistant neutron absorbers of high and uniform capacity which may be employed to significantly increase the storage capacity of both pressurized water reactor and boiling water reactor spent nuclear fuels, normally in the form of rods. The absorbers made may be of the lengths described in the McMurtry et al. application, e.g., 0.8 to 1.2 meters, so few joints are needed when plates are stacked one atop the other to form a continuous longer absorbing wall. Such desirable effects are obtainable using a variety of the phenolic resins described, alone or in combination, some of which may be one-stage and others of which may be two-stage.

The following examples illustrate but do not limit the invention. In the examples and in this specification all parts are by weight and all temperatures are in °C., unless otherwise indicated.

EXAMPLE 1

729 Grams of Ashland Chemical Company Arofene 877 powdered resin are passed through a No. 230 sieve and then are mixed with 1700 grams of boron carbide powder at room temperature (25° C.) for five minutes to produce a homogeneous mixture. The boron carbide powder is one which has been previously washed with hot water and/or appropriate other solvents, e.g., methanol, ethanol, to reduce the boric oxide and any boric acid content thereof to less than 0.5% (actually 0.16%) of boric oxide and/or boric acid, as boric oxide. The powder analyzes 75.5% of boron and 97.5% of boron plus carbon (from the boron carbide) and the isotopic analysis of the boron present is 18.3 weight percent $B^{10}$ and 81.7% $B^{11}$. The boron carbide particles contain less than 2% of iron (actually 1.13%) and less than 0.05% each of halogen, mercury, lead and sulfur. The particle size distribution is 0% on a 35 mesh sieve, 0.4% on 60 mesh, 41.3% on 120 mesh and 58.3% through 120 mesh, with less than 15% through 325 mesh. The 877 resin (sometimes called 877 powder or PDW-877) is a two-stage phenolic resin powder of about 90% solids content (based on final cross-linked polymer), having an average molecular weight of 6,000 to 7,000, and a particle size distribution such that at least 98% passes through a 200 mesh sieve, and containing about 9% of hexamethylenetetramine (HMT). The resinous component is a condensation product of phenol and formaldehyde but instead of the phenol there may be substituted various other phenolic compounds, preferred among which is trimethylol phenol. The Arofene 877 resin exhibits an inclined plate flow of 25–40 mm., a reactivity (hot plate cure at 150° C.) of 60–90 seconds, a softening point (ring and ball, Dennis bar) of 80°–95° C. and is of an apparent density of about 0.32 g./cc. It contains about 1% of volatile material. The resin thereof may be characterized as an unmodified, short-flow, powdered, two-step phenolic resin. Instead of Arofene 877, there may be substituted Arofene 877LF, Arofene 890 or Arofene 1877. After mixing together of the powdered materials, 400 grams of water are poured or dropped onto the moving surfaces of the mix, while it is being agitated in a suitable stainless steel mixer. The mix is allowed to stand for about an hour and then is screened (but when 300 grams of water are used and are found to be sufficient, the mix may be directly screened) through a ten mesh opening screen, after which it may be filled into a mold, leveled and pressed to green article shape, which shape is preferably that of a long thin flat plate, suitable for use in storage racks for spent nuclear fuel.

The mold employed comprises four sides of case hardened steel (brake die steel) pinned and tapped at all four corners to form an enclosure, identical top and bottom plungers about 2.5 cm. thick made of T-61 aluminum, and 1.2 cm. thick top and bottom aluminum tool and jig setter plates, each weighing about one kg. The molds, which had been used previously, are prepared by cleaning of the inside surfaces thereof and insertions of the bottom plunger, the bottom setter plate on top of the plunger and a piece of glazed paper, glazed side up, on the setter plate. A weighed charge (625 grams) of the boron carbide particles-resin-water mix is screened into the mold and is leveled in the mold cavity by means of a series of graduated strikers, the dimensions of which are such that they are capable of leveling from about an 11 mm. thickness to about a desired 8 mm. mix thickness, with steps about every 0.8 mm. A special effort is made to make sure to fill the mold at the ends thereof so as to maintain uniformity of boron carbide distribution throughout. Thus, the strikers are initially pushed toward the ends and then moved toward the more central parts of the molds and they are employed sequentially so that each strike further levels the mix in the mold. A piece of glazed paper is then placed on top of the leveled charge, glazed side down, and the top setter plate and top plunger, both of aluminum, are inserted.

The mold is then placed in a hydraulic press and the powder-resin mix is pressed. The size of the "green" plate made is about 14.7 cm.×77.2 cm.×3.6 mm. and the density thereof is about 1.5 g./cc. The pressure employed is about 143 kg./sq. cm. and it is held for three seconds. The pressure may be varied so long as the desired initial "green" article thickness and density are obtained. After completion of pressing the mold is removed from the press and at an unloading station a ram and a fixture force the plungers, setter plates and pressed mixture upwardly and through the mold cavity. The plungers, setter plates and glazed papers are then removed and the pressed mixture, in "green" article form, is placed between setter plates and intermediate layers of fiberglass cloth and is cured. Curing is effected by heating from room temperature to 149° C. gradually and regularly over a period of three hours, holding at 149° C. for four hours and cooling to room temperature at a uniform rate for three hours. After curing the plates weight 604 grams and their dimensions are essentially the same as after being pressed to green plate form.

The finished plates are of about 72% boron carbide particles and 28% phenolic polymer. When tested they will be found to have a modulus of rupture (flexural), of at least 100 kg./sq. cm. at room temperature, 38° C. and 149° C. (actually 368 kg./sq. cm. at room temperature), a crush strength of at least 750 kg./sq. cm. at 38° C. and 149° C., a modulus of elasticity less than $3\times10^5$ kg./sq. cm. at 38° C. (actually $1.1\times10^5$ kg./sq. cm. at room temperature) and a coefficient of thermal expansion at 66° C. which is less than $1.5\times10^{-5}$ cm./cm. °C. The neutron absorbing plates made are of satisfactory resistance to degradation due to temperature and changes in temperature such as may be encountered in normal uses as neutron absorbers, as in fuel racks for spent nuclear fuels. They are designed to withstand radition from spent nuclear fuel over long periods of time without losing desirable properties and similarly are designed to be sufficiently chemically inert in water so that a spent fuel storage rack could continue to operate without untoward incident in the event that water should leak into a stainless steel or other suitable metal or other container in which they are contained in such a rack. They do not galvanically corrode and are sufficiently flexible, when installed in a spent nuclear fuel rack, to survive seismic events of the types previously mentioned.

The procedure of the example is repeated, using the same batch size and using a batch size about ¼ of that described and the products obtained are useful neutron absorbers of approximately the same properties as described in the preceding example.

When a similar experiment is run (batch size of 2.83 kg.), with the weight charged to the mold being 600 grams instead of 625 grams, a similar product results, with similar physical and chemical characteristics, although about 0.1 mm. thinner. Similarly, when components and proportions are varied, ±10%, ±20% and ±30%, but maintained within the ranges, as described in the foregoing specification, useful boron carbide-resin neutron absorbers may be made while varying the processing conditions, as taught above.

In the above procedures the particulate resin-liquid combination will be chosen so as to result in sufficient holding together of the particles after pressing under the pressures mentioned so that they may be cured in the manner described. Thus, as when water is employed, it sufficiently tackifies the particles or covers them sufficiently so that its surface tension and other adherent forces may hold the particles together after pressing during preliminary drying and during drying associated with the initial steps of the curing operation so that the green article is form-retaining. Also of importance is the fact that the polymeric material, while softening or fusing sufficiently so as to make good bonds to other resin particles and to the boron carbide particles, does not run or flow through the resin particles, which could result in loss of shape and making of a product having irregularly distributed neutron absorber therein.

EXAMPLE 2

3,200 Grams of boron carbide powder and 4,080 grams of silicon carbide powder are mixed together in a steel paddle mixer at room temperature (25° C.) for five minutes and over another five minute period there are admixed therewith 2,450 grams of Ashland Chemical Company Arofene 877 powdered phenol formaldehyde resin. The boron carbide powder and the phenol formaldehyde resin are of the same types as described in the foregoing Example 1. The silicon carbide powder is a mixture of equal parts by weight of a silicon carbide powder which passes through a 50 mesh U.S. Sieve Series screen and fails to pass a 100 mesh sieve, and such a powder which passes a 100 mesh sieve. The more finely divided powder will usually have less than 25% thereof passing through a 325 mesh sieve. The contents of impurities in the silicon carbide particles will be maintained the same as, essentially the same as or less than those of the boron carbide particles. The Arofene 877 resin may be judiciously replaced by Arofene 890, Arofene 1877 or Arofene 877LF or mixtures thereof.

This example may be considered to be like that of Example 1, with some of the boron carbide particles replaced by diluent particles. Usually, the ratio of boron carbide particles: diluent particles will be from 19:1 to 1:19, preferably 9:1 to 1:9, more preferably 1:5 to 5:1 and most preferably 2:1 to 1:2, e.g., about equal parts of each.

After mixing together of the powdered materials 300 grams of water are admixed with them by adding the water onto the moving surfaces of the mix, while it is being agitated in the paddle mixer. Spray nozzles may be employed to distribute the water better and in such cases the spray nozzle and the droplet sizes of the spray will usually be in the 0.5 to 2 mm. diameter range. However, it has been found that is is not required to spray the water or other liquid onto the surfaces of the particulate mixture and actually the water can be poured onto the moving surfaces or dripped onto them, with good mixing and distribution throughout the particulate material being obtained thereby. After completion of mixing the mix may be screened through a 10 mesh opening (or 4 to 40 mesh) screen and may be allowed to stand for about an hour and then is screened through a 10 mesh (or 4 to 40 mesh) screen, after which it may be filled into a mold, preferably after being leveled, and then is pressed to green article shape, which shape is preferably that of a long thin flat plate, suitable for use in storage racks for spent nuclear fuel. Alternatively, instead of screening, followed by some drying and more screening, as described above, the screening may be done directly into the mold. The mold employed is the same as that described in Example 1.

A charge (675 grams) of the boron carbide particles-silicon carbide particles-powdered resin-water mix fills the mold and is leveled in the mold cavity by means of a series of graduated strikers, the dimensions of which are such that they are capable of leveling from about a 12 mm. thickness to a desired 9 mm., with steps about every 0.8 mm. The strikers are employed as in Example 1. A piece of glazed (or other suitable) paper is then placed on top of the leveled charge, glazed side down and the top setter plate and top plunger, both of aluminum, are inserted.

The mold is then placed in a hydraulic press and the powder-resin mix is pressed. The size of the "green" plate made is about 14.7 cm. by 77.2 cm. by 3.6 mm. and the density thereof is about 1.6 g./cc. The pressure employed is about 143 kg./sq. cm. and it is held for three seconds. The pressure may be varied so long as the desired initial "green" article thickness and density are obtained. After completion of pressing the mold is removed from the press and at an unloading station a ram and a fixture force the plungers, setter plates and pressed mixture upwardly and through the mold cavity. The plungers, setter plates and glazed papers are then removed and the pressed mixture, in green article form, is placed between setter plates and intermediate layers of fiberglass cloth and is cured. Curing is effected by heating from room temperature to 149° C. gradually and regularly over a period of three hours, holding at 149° C. for four hours and cooling to room temperature at a uniform rate for three hours. After curing the plate weighs 640 grams and its dimensions are essentially the same as after being pressed to green plate form.

The finished plate is of about 72% of a total of boron carbide and diluent particles (31.6% of boron carbide and 40.4% of silicon carbide) and 28% of phenolic polymer. It appears to have the same desirable properties (except for lower neutron absorbing capability) as a similar product in which the silicon carbide particles are replaced by boron carbide particles. Thus, when tested it will be found to have a modulus of rupture (flexural) of at least 100 kg./sq. cm. at room temperature, 38° C. and 149° C. (actually 496 kg./sq. cm. at room temperature), a crush strength of at least 750 kg./sq. cm. at 38° C. and 149° C., a modulus of elasticity less than $3\times10^5$ kg./sq. cm. at 38° C. (actually $1.2\times10^5$ kg./sq. cm. at room temperature) and a coefficient of thermal expansion at 66° C. which is less than $1.5\times10^{-5}$ cm./cm. °C. The neutron absorbing plates made will be of satisfactory resistance to degradation due to temperature and changes in temperature such as may be encountered in normal uses as neutron absorbers, as in fuel racks for spent nuclear fuels. They are designed to withstand radiation from spent nuclear fuel over long periods of time without losing desirable properties and similarly are designed to be sufficiently chemically inert in water so that a spent fuel storage rack could continue to operate without untoward incident in the event that water should leak into a stainless steel or other suitable metal or other container in which they are contained in such a rack. They do not galvanically corrode and are sufficiently flexible, when installed in a spent nuclear fuel rack, to survive seismic events of the types previously mentioned. In other words, they will be of essentially the same properties as the neutron absorbing plates described in the Owens patent application previously referred to except when they are of a lesser neutron absorbing capability due to being diluted with the silicon carbide particles.

This example is essentially the same as Example 1 of U.S. patent application Ser. No. 866,101, referred to previously in this specification. That application relates to new neutron absorbing compositions based on boron carbide, diluent particles and phenolic resin and in Example 1 describes the present preferred method of manufacturing such compositions.

When the experiment of this example is repeated, with the silicon carbide being replaced by amorphous carbon, graphite, alumina or silica of essentially the same particle sizes and distributions or with equal mixtures of diluent components in 2-component or multi-component mixtures, e.g., amorphous carbon and graphite, amorphous carbon and silicon carbide, or amorphous carbon, graphite and silicon carbide, the same type of useful neutron absorber may be made. Also, when component proportions are varied, ±10%, ±20%, and ±30%, while being maintained within the ranges given in the foregoing specification, useful neutron absorbers may be made while varying the processing conditions, as taught above. Thus, evenly absorptive neutron absorbers of any of a desired range of activities may be readily produced.

EXAMPLE 3

The procedure of Example 1 may be varied by replacing 3/5 of the boron carbide particles with any of the following: graphite; amorphous carbon; silicon carbide; alumina; silica; one part of silicon carbide and one part of graphite; one part of silicon carbide and one part of amorphous carbon; one part of silicon carbide and one part of silica; one part of alumina and one part of silica; or one part each of silicon carbide, graphite, alumina and silica. The particle sizes of the various powders described may be like those of the boron carbide, the silicon carbide and/or the resin. Initially, before mixing with powdered resin, it is desirable for the boron carbide particles and the diluent particles to be mixed but various orders of addition may also be employed in these dry mixings. The neutron absorbing articles may be made from the wetted mixtures in the same manners as described in Examples 1 and 2 above and the products resulting will be of essentially the same physical characteristics described for the products of Example 2. Also, various other resins may be substituted for Arofene 877 and the proportions thereof may be changed within the ranges described in the specification, e.g., $\pm10\%$, $\pm20\%$ and $\pm30\%$, all being maintained within such described ranges, and useful products of the desired properties will also result. Among the other resins which may be employed are those previously listed by name in the foregoing specification, plus Arofenes 7209; 6746; 6752; 6782; 612; 669; 6403; 6690; 8723; 872; 875; 2869; 8835; 86753; 86781; 8907; 8909; and 8915. Some of such resins are one-step resins and others are two-step resins. Some of the two-stage resins include curing agent (HMT) and others do not. When no curing agent is in the formulation it may be added and one may also employ an aqueous solution of formaldehyde as a "bonding agent", rather than water or water-solvent solution. When the resinous products are in solid forms other than finely divided powder, such as previously described, it will be desirable to grind them or otherwise suitably size-reduce and/or deagglomerate them to the desired particle size range before use.

The invention has been described with respect to various illustrations and embodiments thereof but it is not to be limited to these because it is evident that one of skill in the art, with the present specification before him, will be able to utilize substitutes and equivalents without departing from the spirit of the invention.

What is claimed is:

1. A one-step curing method for the manufacture of a neutron absorbing article which comprises irreversibly curing, in desired article form, a form-retaining mixture of boron carbide particles, curable phenolic resin in solid state and in particulate form and a minor proportion of a liquid medium, which boils at a temperature below 200° C., at an elevated temperature so as to obtain bonding of the irreversibly cured phenolic polymer resulting to the boron carbide particles and production of the neutron absorbing article in desired form.

2. A method according to claim 1 wherein the liquid medium is an aqueous medium and is 1 to 12% of the article before curing, said aqueous medium is mixed with a mixture of the boron carbide and curable phenolic resin particles and curing is effected at a temperature above the boiling point of the aqueous medium while the neutron absorbing article, in desired form, is unconstrained by compacting or pressing means, and the neutron absorbing article resulting is of a greater content of cured phenolic polymer than is obtained by making a formed neutron absorbing article by a one-step cure effected without holding the mixture under pressure in contacting or pressing means when the curable phenolic resin is in liquid state.

3. A method according to claim 2 wherein the neutron absorbing article is in plate form, the boron carbide particles are of a particle size such that substantially all pass through a No. 20 U.S. Sieve Series screen, the proportion of phenolic resin to boron carbide particles is such that the $B^{10}$ content of the plates is at least 6%, the resin is a phenol formaldehyde type resin powder capable of being irreversibly heat cured at a temperature in the range of about 130° to 200° C., the moisture content of the article being cured is in the range of 1 to 12%, the article being cured is one which has been pressed to plate form prior to curing, and curing is effected at a temperature in the range of about 130 to 200° C. and with the article supported by a setter plate with a major surface of the article in contact with such plate, to produce a neutron absorbing plate which is utilizable in a storage rack for spent nuclear fuel over a temperature range at which the spent nuclear fuel is stored, withstands thermal cycling from repeated spent fuel insertions and removals and withstands radiation from said spent nuclear fuel for long periods of time without losing desirable neutron absorbing and physical properties, is sufficiently chemically inert in water so as to retain neutron absorbing properties in the event of a leak allowing the entry of water into an enclosure for the plate and into contact with it in a storage rack for spent nuclear fuel, does not galvanically corrode and does not cause such corrosion and is sufficiently flexible so as to withstand operational basis earthquake and safe shutdown earthquake seismic events without loss of neutron absorbing capability and other desirable physical properties.

4. A method according to claim 2 wherein from 1/10 to 9/10 of the boron carbide particles are replaced by diluent particles of a material selected from the group consisting of silicon carbide, alumina, silica, graphite and amorphous carbon and mixtures thereof.

5. A method according to claim 3 wherein the boron carbide particles are substantially of a size to pass through a No. 35 U.S. Sieve Series screen, they contain at least 12% of $B^{10}$, the resin powder is a phenol formaldehyde of particle sizes such as to pass a No. 35 U.S. Sieve Series screen, the proportions of boron carbide particles and phenolic resin are from 60 to 80 parts of boron carbide particles and 20 to 40 parts of resin, the aqueous medium is water and 2 to 8 parts thereof are present, the mixture of boron carbide particles, phenol formaldehyde resin and aqueous medium is compacted to plate shape of desired thickness and density at a pressure of about 20 to 500 kg./sq. cm. and the curing is effected at a temperature of about 130° to 180° C. for a period of about 2 to 20 hours to produce plates of a density in the range of 1.2 to 2.8 g./cc. containing from 8.5 to 11.5% of $B^{10}$.

6. A method according to claim 5 wherein the neutron absorbing plates made consist essentially of boron carbide particles and phenol formaldehyde resin, the boron carbide particles contain no more than 2% of iron and no more than 0.5% of $B_2O_3$, at least 95% of them pass through a No. 60 U.S. Sieve Series screen and at least 50% of such particles pass through a No. 120 U.S. Sieve Series screen, the phenol formaldehyde resin is of a molecular weight in the range of 1,200 to 10,000, is a two-stage resin containing hexamethylene tetramine in sufficient quantity to provide formaldehyde to cure the resin and is of a particle size such as to pass a 100 mesh U.S. Sieve Series screen, the moisture content of the formed mixture being cured is 2 to 5%, the curable phenol formaldehyde two-stage resin and the irreversibly cured polymer resulting are substantially free of halogens, lead, mercury, sulfur, filler, plasticizer and solvent, the boron carbide particles and resin powder are mixed, water is added to the mix, while mixing, compacting of the wetted mix resulting is effected at a pressure of about 35 to 150 kg./sq. cm. for a period of about 2 to 5 seconds, and after release of the compacting pressure curing is effected over a period of 2 to 10 hours at a temperature of 140° to 160° C., the plates produced are of a thickness from 0.2 to 1 cm., a width from 10 to 100 times the thickness and a length from 20 to 500 times the thickness, the modulus of rupture thereof (flexural) is at least 100 kg./sq. cm. at room temperature, 39° C. and 149° C., the crush strength is at least 750 kg./sq. cm. at 38° C. and 149° C., the modulus of elasticity is less than $3\times10^5$ kg./sq. cm. at 38° C. and the coefficient of thermal expansion at 66° C. is less than $1.5\times10^{-5}$ cm./cm.°C.

7. A method according to claim 1 wherein from 1/10 to 9/10 of the boron carbide particles are replaced by diluent particles.

8. A method according to claim 3 wherein from $\frac{1}{3}$ to $\frac{2}{3}$ of the boron carbide particles are replaced by particles of sizes in the range given for the boron carbide particles of a material selected from the group consisting of silicon carbide, alumina, silica, graphite and amorphous carbon and mixtures thereof.

9. A method according to claim 5 wherein 1/10 to 9/10 of the boron carbide particles are replaced with silicon carbide particles of sizes in the same range as that specified for the boron carbide particles and such are mixed with the boron carbide particles, resin and moisture before being pressed to desired shape before curing.

10. A method according to claim 6 wherein $\frac{1}{3}$ to $\frac{2}{3}$ of the boron carbide particles are replaced with silicon carbide particles of sizes in the same range as that specified for the boron carbide particles and such are mixed with the boron carbide particles, resin and moisture before being pressed to desired shape before curing.

* * * * *